US011700800B2

United States Patent
Rodriguez

(10) Patent No.: US 11,700,800 B2
(45) Date of Patent: Jul. 18, 2023

(54) PROTECTIVE TREE TUBE, METHOD, AND REVETMENT USING TREE CONTAINED IN SAME

(71) Applicant: Joseph Edward Rodriguez, Celebration, FL (US)

(72) Inventor: Joseph Edward Rodriguez, Celebration, FL (US)

(*) Notice: Subject to any disclaimer, the term of this patent is extended or adjusted under 35 U.S.C. 154(b) by 679 days.

(21) Appl. No.: 16/700,380

(22) Filed: Dec. 2, 2019

(65) Prior Publication Data

US 2020/0170202 A1    Jun. 4, 2020

Related U.S. Application Data

(60) Provisional application No. 62/773,425, filed on Nov. 30, 2018.

(51) Int. Cl.
*A01G 23/04* (2006.01)
*A01G 13/02* (2006.01)

(52) U.S. Cl.
CPC .......... *A01G 23/04* (2013.01); *A01G 13/0237* (2013.01)

(58) Field of Classification Search
CPC .. A01G 23/04; A01G 9/0291; A01G 13/0281; A01G 13/0293; A01G 13/0237; A01C 14/00
USPC ........................................ 47/73, 66.7, 78, 75
See application file for complete search history.

(56) References Cited

U.S. PATENT DOCUMENTS

| | | | | |
|---|---|---|---|---|
| 5,325,627 A | * | 7/1994 | Anderson | A01G 13/0281 47/84 |
| 6,195,935 B1 | * | 3/2001 | Bellucci | A01G 13/0281 47/9 |
| 9,986,695 B1 | * | 6/2018 | Abdulzahra | A01G 13/0243 |
| 2009/0266739 A1 | * | 10/2009 | Kindig | B65D 85/30 206/521 |
| 2014/0208645 A1 | * | 7/2014 | Guggenheim | A01G 13/0243 47/65.5 |

FOREIGN PATENT DOCUMENTS

| | | | | |
|---|---|---|---|---|
| CN | 107100135 A | * | 8/2017 | |
| GB | 2477216 A | * | 7/2011 | ............... A01G 9/02 |

OTHER PUBLICATIONS

Translation of Zhao (Year: 2017).*

* cited by examiner

*Primary Examiner* — Christopher D Hutchens
*Assistant Examiner* — Nicole Paige Maccrate
(74) *Attorney, Agent, or Firm* — The Concept Law Group, PA; Scott M. Garrett; Scott D. Smiley

(57) ABSTRACT

A protective tree tube has an elongated hollow body that is made of a biodegradable material, and has holes formed in the wall of the tube. The tube can be filled, at a bottom portion, with drainage material, and on top of the drainage material a planting material can be provided in which the root ball of a tree is placed. Upon placing the protective tree tube with the tree into a planting hole, the protective tree tube ca be buried and thereafter the tree will commence forming new rootage and become established.

13 Claims, 7 Drawing Sheets

US 11,700,800 B2

PROTECTIVE TREE TUBE, METHOD, AND REVETMENT USING TREE CONTAINED IN SAME

CROSS REFERENCE

This application is a non-provisional application claiming priority to U.S. provisional application No. 62/773,425, which was filed on Nov. 30, 2018, the entirety of which is hereby incorporated by reference.

FIELD OF THE DISCLOSURE

The present disclosure relates generally to arboriculture, and, more particularly, relates to a the protection of trees in the transport and planting of the trees, particularly for use in vegetative revetments and similar construction applications.

BACKGROUND OF THE DISCLOSURE

A revetment is a structure designed to protect against erosion at a point where land meets a body of water. Natural erosion can occur from movement of water due to currents, as in a river or stream, or by wave action, or both. In some locations the presence of water may be seasonal, or due to storms, rather than permanent. Revetments commonly include stone and/or concrete structures, as well as mechanically stabilized earth. These structures, while effective, are not always aesthetically pleasing, and can appear to be disharmonious with nearby natural foliage.

It is well known that plants can be used to help prevent erosion, and it is common to cover earthen surfaces with plants such as grasses. While grasses and similar shallow rooting plants are effective at preventing surface erosion, they don't root deep enough to help strengthen and stabilize the underlying soil, which is often fill soil. To help address this need trees can be planted in revetments. Trees will, if they become established, root deep into the revetment and supporting soil to help stabilize and retain the earth that supports the hard exterior portion of the revetment (e.g. stones). However, getting trees established in revetments has proven difficult. When a tree is brought from a nursery to a planting site, the tree has been dug from the ground at the nursery, leaving a root ball that is typically wrapped to reduce drying of the root ball. The tree is then transported to a planting site, where it is typically placed on the ground prior to being moved and positioned into a planting hole. Once positioned in the planting hole, it is typically stabilized with stakes and ropes to prevent the tree from getting pushed by wind and upsetting the new root growth. It is not uncommon for the stake and rope stabilizing system to fail, leaving the tree vulnerable to damage and loss. Furthermore, when trees do eventually become established, then the stakes and ropes must be removed.

Therefore, a need exists to overcome the problems with the prior art as discussed above.

SUMMARY

In accordance with some embodiments of the inventive disclosure, there is provided a protective tree tube that includes an elongated hollow body with a top end and a bottom end and a side wall between the top end and bottom end. The elongated hollow body is comprised of a biodegradable material and has a plurality of holes formed in the elongated hollow body through the side wall. The protective tree tube further includes a bottom cap covering the bottom end of the elongated hollow body which is comprised of a biodegradable material, and has a plurality of drainage openings formed through it. The protective tree tube further includes a bottom retainer having a first portion that fits against an outer surface of the bottom cap, and a second portion depending from the first portion that extends at least partially around the side wall of the elongated hollow body. The protective tree tube further includes a plurality of fasteners coupling the bottom retainer to the bottom cap at the bottom end of the elongated hollow body. The plurality of fasteners including a first plurality that pass through the first portion of the bottom retainer and the bottom cap, and a second plurality that pass through the second portion of the bottom retainer and the bottom end of the elongated hollow body.

In accordance with another feature, there is further provided a top cap which covers the top end of the elongated hollow body and which is made of a biodegradable material, and has a plurality of ingress openings formed through it. In accordance with the further feature, there is further provided a top retainer having a first portion that fits against an outer surface of the top cap, and a second portion depending from the first portion that extends at least partially around the sidewall of the elongated hollow body at the top end. In accordance with the further feature, there is further provided a plurality of fasteners coupling the bottom retainer to the bottom cap and the bottom end of the elongated hollow body, including a first plurality that pass through the first portion of the bottom retainer and the bottom cap, and a second plurality of fastener that pass through the second portion of the bottom retainer and the bottom end of the elongated hollow body.

In accordance with further feature, the top cap comprises two members, each member being planar and sized and shaped to cover the top end of the elongated hollow body, and having a slot formed from an edge to a center of the respective member.

In accordance with further feature there is further provided a top double wall portion at the top end of the elongated hollow body that extends downward from the top end and ends at a point above a midway point along the elongated hollow body. In accordance with the further feature, there is further provided a bottom double wall portion at the bottom end of the elongated hollow body that extends upward from the bottom end and ends at a point below the midway point along the elongated hollow body. The top and bottom double wall portions do not cover a middle portion of the elongated hollow body. In accordance with the further feature, there is further provided a jute wrapping portion provided around the elongated hollow body at the middle portion of the elongated hollow body that is not covered by the top and bottom double wall portions.

In accordance with further feature, the bottom double wall portion has holes that correspond to holes in the elongated hollow body and the top double wall portion lacks holes.

In accordance with some embodiments of the inventive disclosure, there is provided a method of packaging a tree for transport and planting that includes providing a protective tree tube; the protective tree tube having an elongated hollow body with a top end and a bottom end and having a plurality of holes formed in the elongated hollow body, and a bottom cap covering the bottom end of the elongated hollow body, wherein the elongated hollow body and the bottom cap are made of biodegradable materials. The method further includes placing a drainage material into a bottom portion of the elongated hollow body such that a top of the drainage material is above at least a lower-most set of holes in the elongated hollow body. The method further includes placing a planting medium on top of the drainage material, placing a tree into the protective tree tube such that a root ball of the tree is surrounded by the planting medium and a trunk of the tree extends through the top end of the protective tree tube.

In accordance with a further feature, the method can further include placing a fabric barrier between the drainage material and the planting medium.

In accordance with a further feature, the method can further include placing a bottom retainer having a first portion that fits against an outer surface of the bottom cap, and a second portion depending from the first portion that extends partially along the elongated hollow body, and a plurality of fasteners coupling the bottom retainer to the bottom cap and the bottom end of the elongated hollow body, including a first plurality that pass through the first portion of the bottom retainer and the bottom cap, and a second plurality of fastener that pass through the second portion of the bottom retainer and the bottom end of the elongated hollow body.

In accordance with a further feature, the method can further include placing a top cap covering the top end of the elongated hollow body and comprised of a biodegradable material and having a plurality of ingress openings formed through the top cap. The method can further include placing a top retainer having a first portion that fits against an outer surface of the top cap, and a second portion depending from the first portion that extends partially along the elongated hollow body at the top end. The method can further include placing a plurality of fasteners coupling the bottom retainer to the bottom cap and the bottom end of the elongated hollow body, including a first plurality that pass through the first portion of the bottom retainer and the bottom cap, and a second plurality of fastener that pass through the second portion of the bottom retainer and the bottom end of the elongated hollow body.

In accordance with a further feature, placing the top cap includes placing two cap members, each of the cap members having a slot that extends from a side of the cap member to the center of the cap member and is sized to pass over the trunk of a tree planted in the protective tree tube, and wherein the method further comprises arranging the cap members so that their respective slots only overlap at the centers of the two cap members.

In accordance with a further feature, the method can include placing a top double wall portion at the top end of the elongated hollow body that extends downward from the top end and ends at a point above a midway point along the elongated hollow body. The method can further include placing a bottom double wall portion at the bottom end of the elongated hollow body that extends upward from the bottom end and ends at a point below the midway point along the elongated hollow body. The top and bottom double wall portions leave a middle portion of the elongated hollow body exposed. The method can further include placing a jute wrapping portion provided around the elongated hollow body at the middle portion of the elongated hollow body.

In accordance with some embodiments of the inventive disclosure, there is provided a method of planting a revetment that includes digging at least one hole in a portion of the revetment, wherein the hole extends into a mechanically stabilized earth portion of the revetment. The method further includes placing a tree that is planted in a protective tree tube into the at least one hole. The protective tree tube includes an elongated hollow body with a top end and a bottom end and having a plurality of holes formed in the body, and a bottom cap covering the bottom end of the elongated hollow body. The elongated hollow body and the bottom cap are made of biodegradable materials. The method can further include placing a drainage material into a bottom portion of the elongated hollow body such that a top of the drainage material is above at least a lower-most set of holes in the elongate hollow body. The method can further include placing a planting medium on top of the drainage material. The tree includes a root ball that is thereby surrounded by the planting medium.

In accordance with a further feature of the method, digging the at least one hole includes digging at least one hole behind a riprap portion of the revetment.

In accordance with a further feature of the method, digging the at least one hole comprises digging at least one hole at a top level of the revetment.

Although the invention is illustrated and described herein as embodied in a protective tree tube, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein or in any related applications, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the protective tree tube axis. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
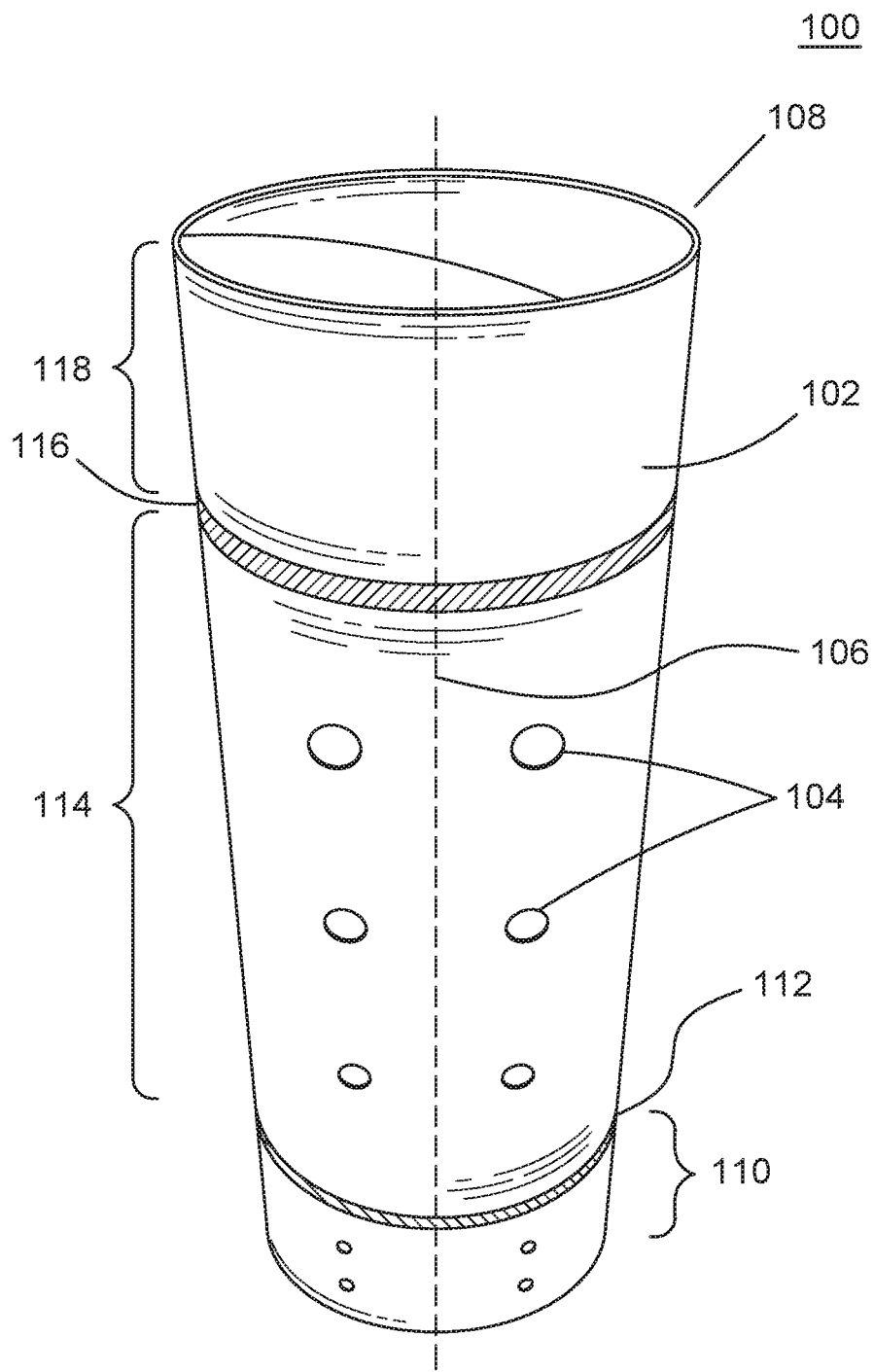
FIG. 1 shows a view of the elongated hollow body for a protective tree tube, in accordance with some embodiments.

While the specification concludes with claims defining the features of the inventive disclosure that are regarded as novel, it is believed that the claimed invention will be better understood from a consideration of the following description in conjunction with the drawing figures. It is to be understood that the disclosed embodiments are merely exemplary of the invention, which can be embodied in various forms.

FIG. 1 shows a view of the elongated hollow body 102 for a protective tree tube 100, in accordance with some embodiments. The elongated hollow body 102 can be several feet high when stood on end as shown, and one or more feet in diameter, or from one side to an opposing side, in the horizontal direction in the orientation shown. In some embodiments the cross section of the elongated hollow body 102, rather than being circular as shown here, can be square, or other shapes. The elongated hollow body 102 is formed of an outer wall (or walls) that can be made of a biodegradable material, and includes a plurality of holes or openings 104 in the wall to allow water and, eventually, tree roots, to pass through the wall. The holes 104 can be of selected sizes, suited to the overall size of the body and the type of tree or other woody plant being placed in the body 102, as well as the position on the body 102. The hollow body defines an axis 106 around which the outer wall is formed, and the body 102 is, when formed, open at a top end 108 and bottom end (i.e. at both ends). The body 102 can be made of wood pulp derivatives, such as paper or cardboard that is laminated using a biodegradable adhesive. In some embodiments the body 102 can be formed from a tube winding machine that continuously outputs a reinforced wound paper tube that is cut, as the continuous tubing is formed, to provide tubes (i.e. a body) of a desired length. The drainage and root holes 106 can then be formed in the wall of the body 102. In some embodiments indicia can be formed on the outside of the body to indicate, for example, levels for drainage material and planting material. For example, as shown here, a bottom section 110 of the body 102 extends from the bottom of the body 102 to a black encircling stripe, and can be painted or otherwise colored. The bottom section 110 of the body 102 can be filled with drainage material (e.g. sand, gravel). In a middle section 114 between the lower stripe 112 and an upper stripe 116 can be the portion of the body in which the root ball of the tree/shrub and planting medium are placed. The upper portion 118 above the upper stripe 116 can be a protective portion of the body 102 that extends above ground level to protect the base of the tree trunk when the body 102 is placed in the ground. Moisture retaining material may be placed in this portion as well.

In actual usage a bottom cover is attached to the bottom of the body 102, then drainage material is added to fill the bottom portion 110, such as course gravel, sand, or stones, depending on the particular plant and the planting site. Planting medium is then placed on top of the drainage material, and the two materials can be separated by a screen or fabric layer. The root ball of the tree/shrub is placed in, and surrounded by the planting medium in the middle portion 114. The upper portion 118 extends above ground when the body is planted to protect the lower portion of the trunk of the tree, and can also receive a cover through which the tree trunk passes that can further stabilize the tree during transport, planting, and after planting to facilitate establishment of the tree. Additionally, having the upper portion 118 extend above ground help contain water delivered to the tree early on in the planting and establishment phases, unlike the convention of simply wrapping a root ball with burlap and spraying it with water, or building an earthen dam around the planted tree, as is common, to prevent water run-off. Accordingly, the location of the lower stripe 112 and upper stripe 116, and the length of the body 102 from top to bottom (vertically as shown) are selected based on the type of tree being planted and the planting site construction. Although the tree tube 100 can be used for general tree planting and landscaping, it is particularly suited for ornamental revetments.

Figure 2:
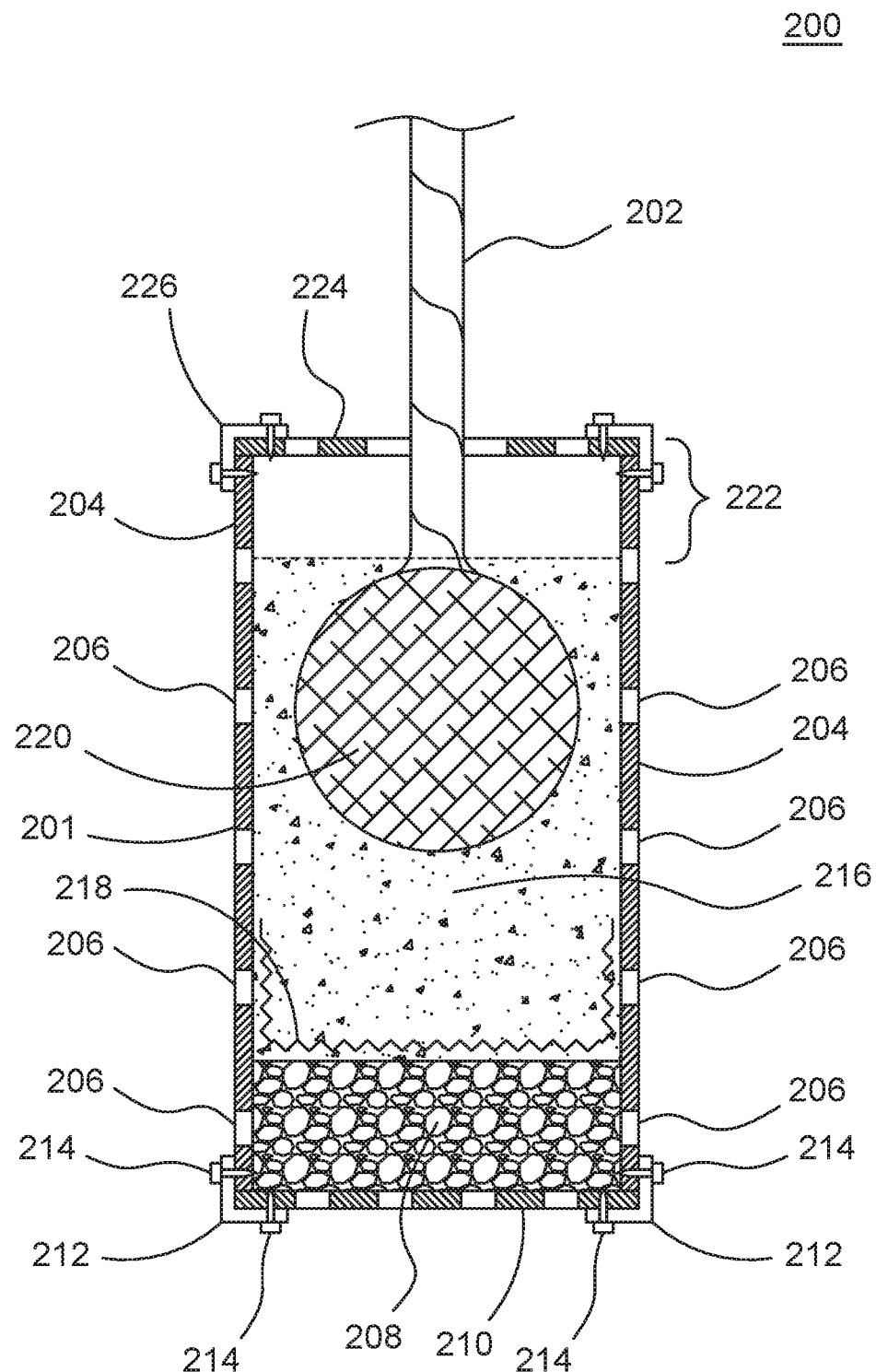
FIG. 2 shows a side cutaway view of a protective tree tube in which a tree is placed, in accordance with some embodiments.

FIG. 2 shows a side cutaway view of a protective tree tube 200 in which a tree 202 is placed, in accordance with some embodiments. The protective tree tube 200 can be formed with an elongated hollow body 201 such as that shown in FIG. 1, and includes a wall 204 having a plurality of root and drainage holes/opening/apertures 206 formed through the wall 204. Drainage material 208 is disposed in a bottom portion of the body of the tube. In some embodiments, a planting hole can be dug, and the elongated hollow body placed in the planting hole, and the elongated hollow body is then filled on site, avoiding the need for a bottom cap 210. In some embodiments, however, the tree 202 can be transported to the planting site in the protective tree tube 200, in which case a bottom cap 210 will be placed over the bottom opening of the body, and can be retained by a retainer 212. The retainer 212 can be a circular member having a first portion (horizontal) that goes against an outer surface of the bottom cap 210, and a second portion (vertical) that depends from the first portion, along the outer vertical wall 204 (i.e. at a right angle to the first portion) of the body. The bottom retainer 212 can be held in place by a plurality of fasteners 214 that pass through the first and second portions of the retainer 212, and the bottom cap 210 and the wall 204, respectively.

On top of the drainage material 208 there is provided a portion of planting medium/material 216. The drainage and planting material can be separated by a fabric portion 218 that covers the drainage material and extends partially up the inside wall of the main tube body. The fabric portion 218 will allow water to pass, but will substantially prevent the planting material 216 from being dispersed into the spaces formed among the drainage material 208. The planting medium 216 can include organic matter that will break down and provide nutrients for the tree as it becomes established, as well as slow-release fertilizer, depending on the application. The root ball 220 of the tree is disposed in, and surrounded by the planting medium 216 a distance from the drainage medium 208. In some embodiments, it is preferred that the tube 200 is filled to about the half way point with the drainage material 208 and some of the planting material 216, then the root ball 220 is placed into the tube, and the remainder of the planting material portion (e.g. 114) of the tube 200 is filled with planting material 216. The root ball 220 is typically wrapped in, for example, burlap, which will break down over time. A top portion 222 of the tube/body 200 can be left unfilled, or can be filled with water absorbing/retaining material (e.g. sphagnum). The inner diameter of the tube 200 can be selected based on the size of the root ball 220 of the tree/shrub being placed in the tube 200 such that there can be about three to six inches of planting material 216 between the root ball and the inner wall of the tube 200. The planting material 216 can be loosely or firmly packed, depending on the application and species of plant being planted. In some applications there can be less than three to six inches of planting material 216 between the root ball 220 and the inner wall of the tube 200, such as when very young trees are planted in the tube 200. Accordingly, the tube 200 can be made in a variety of dimensions in both height and diameter (or equivalent for non-circular tubes), and the selection of tube size will be dependent on species and application. Generally the diameter of the tube is less than the height of the tube, although it is contemplated that in some applications the diameter of the tube can be greater than the height of the tube. In some embodiments multiple tree can be placed in a tube with the intent of having the individual plants fuse together as they grow.

In some embodiments the upper portion of the tube/body 200 that is not filled will extend above ground level once the tube 200 is planted in a planting hole. Thus the hole must be less deep than the length (height) of the tube 200. In some embodiments a top cap 224 can be placed over the top end, and held in place by a top or upper retainer 226, similar to the bottom cap/retainer 212. The top cap 224 can act to stabilize the tree against wind, preventing it from being pushed over and disturbing new rootage, as well as protect the trunk of the tree and preventing debris and other matter from collecting in the tube. The top cap 224 can have both a central hole for the trunk of the tree 202, as well as additional smaller holes for watering. Depending on the tree/shrub 202 species, the top cap 224 can be left on after planting, or removed after planting, or removed some time after planting. The top cap 224 can be constructed of a first member having a slot extended from the side to the center hole, forming a general "C" shape, hand having the side walls that extend downward over the vertical sides of the body 204. A second member that is also "C" shaped with a slot, but lacking vertical sides, can then fit over the top of the first member, with the slot oriented in a different direction to cover the slot of the first member. The fastener 226 can then be used to join the two members together, thereby sealing off the top of the tube 200 with the tree 202 in place.

Figure 3:
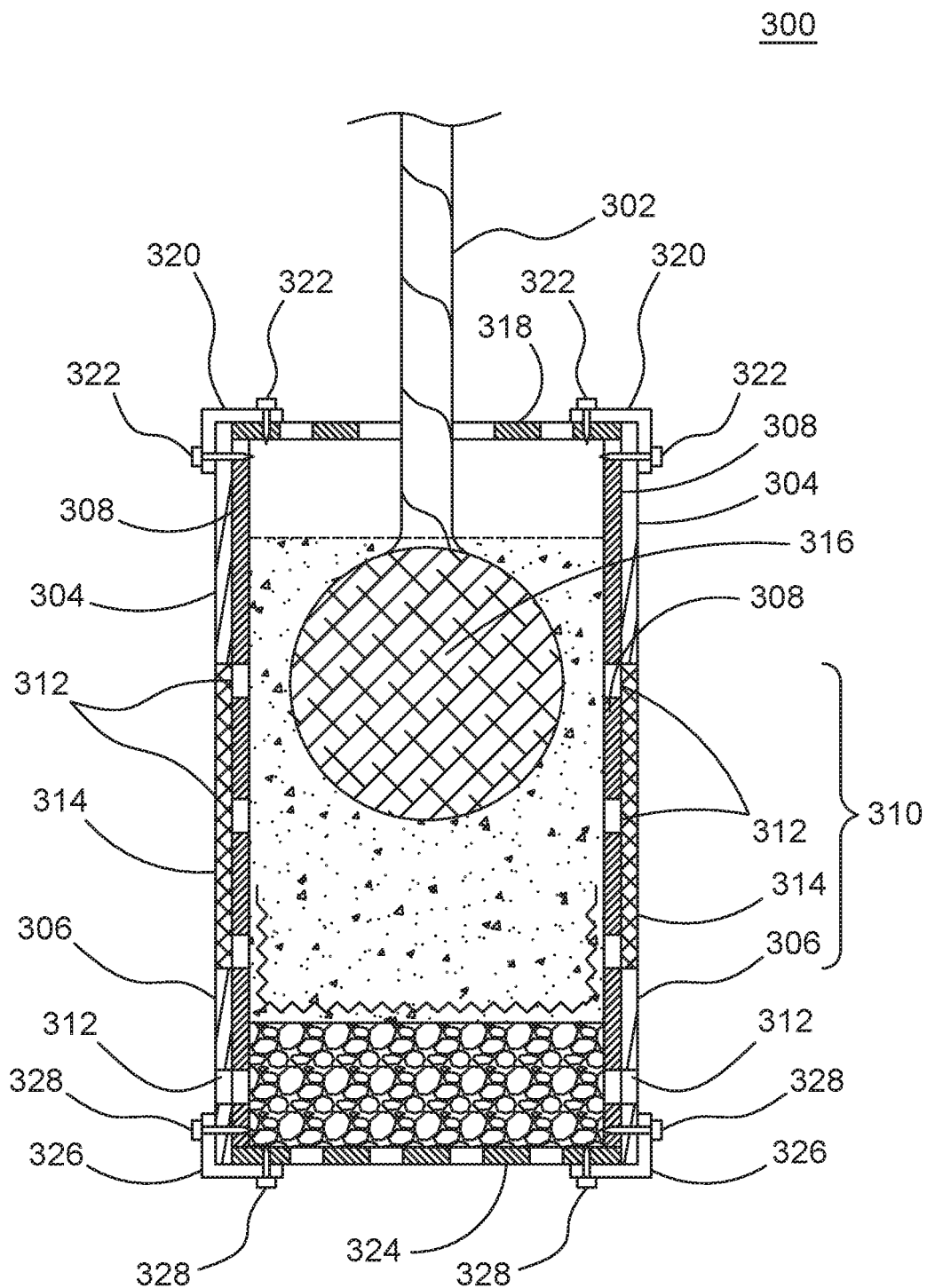
FIG. 3 shows a side cutaway view of a protective tree tube, in which a tree is placed, and having double walled portions, in accordance with some embodiments.

FIG. 3 shows a side cutaway view of a protective tree tube 300, in which a tree 302 is placed, and having double walled portions, in accordance with some embodiments. The double walled portions are coaxial tube sections 304, 306 that fit over the upper and lower/bottom ends of the main tube body 308, but which leave a middle portion 310 of the main tube body uncovered at the outside. The upper double wall portion 304 over the upper end of the main tube body can extend down to about the mid-level of the root ball 312. The bottom and upper double wall portions 304, 306 have holes 312 formed through them that correspond to holes in the main tube body 308. Ideally, the holes 312 are formed through both the double wall section(s) and the main tube body at the same time. Additional holes 312 are formed in the exposed middle portions of the main tube body for allowing water and root to pass out of the tube 300. The middle portion 310 of the main tube body 308, that is not covered by double wall portions 304, 306, can be wrapped in a burlap or jute mesh material 314, or jute cordage that may break down faster than the double wall portions 304, 306, thereby providing strength to the middle portion 310 but allowing rootage to form outside the main tube 308 with minimal restriction. The exterior wrap 314 around the middle portion 310 can be selected to substantially break down by the time sufficient rootage has grown out of the root ball 316. It is also noted that in some embodiments, such as that shown here, that the upper double wall portion 304 and the upper portion of the main tube 308 over which the upper double wall portion 304 is placed may lack any holes/opening, with the holes being present in the main body tube 308 only below the upper portion of the main body tube 308. The level at which holes can be placed can be, for example at 25% of the length of the main body tube 308 from the top end of the main body tube 308. Furthermore, the upper double wall portion 304 can be positioned such that a top of the upper double wall portion 304 extends above the top of the main body tube 308 so as to capture one or more cap members 318, and a top retaining member 320 can be placed over the cap members 318 and over the upper double wall portion 304 and main body tube 308 with fasteners 322 to hold the unit together at the top end. Likewise, the bottom double wall portion 306 is positioned to extend below a bottom of the main body tube 308, thereby capturing a bottom cap member 324 in place against the bottom of the main body tube 308. A bottom retaining member 326 fits over the bottom end of the assembly, including the bottom double wall portion 306, and is held in place by fasteners 328. The fasteners 328 on the side of the assembly pass through both the bottom double wall portion 306 and the main body tube 308.

Figure 4:
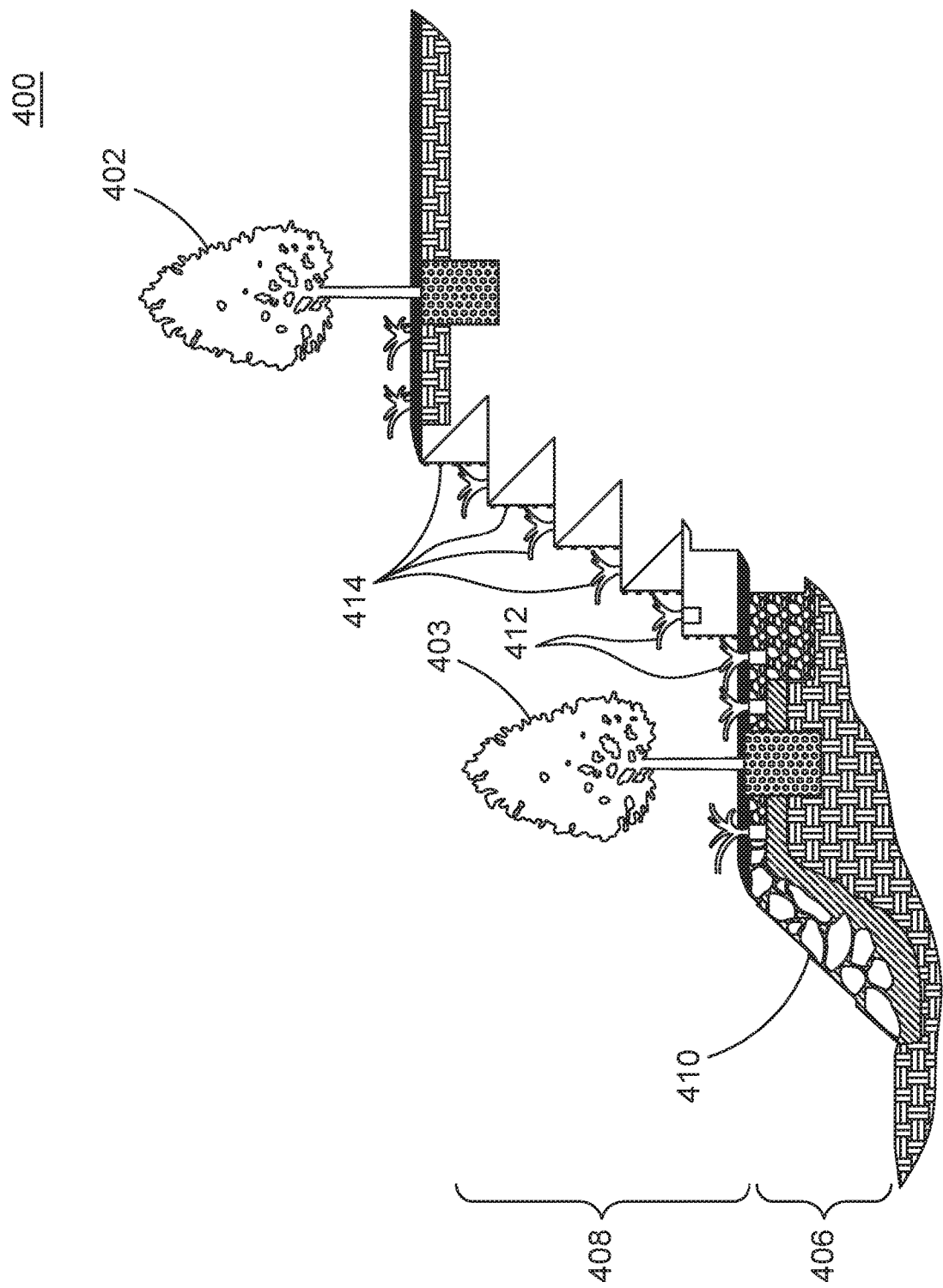
FIG. 4 shows a side cutaway view of a vegetative revetment including trees planted in protective tree tubes, in accordance with some embodiments.

FIG. 4 shows a side cutaway view of a vegetative revetment 400 including trees 402, 404 403 planted in protective tree tubes, in accordance with some embodiments. Although shown here with the upper portion of the tube body level with the ground surface, it will be appreciated that a portion of the tube body can extend above the ground surface. The revetment system shown here is a multi-level revetment system, having a lower, water level layer 406 that includes a stone rip rap portion 410 at a water interface. Behind the rip rap, trees such as tree 403 can be planted in the protective tree tubes as shown. The trees can be selected to be a species compatible with the water table at this level, for the climatic region. For example, in the southeastern United States, *Taxodium distichum*, known as bald cypress, can be planted in regions that will be flooded periodically and have a permanent water saturation. Roots of the tree can eventually spread into the rip rap 410 to help retain the stones. The revetment can include higher levels such as level 408 formed with stone regions contained in baskets 412 to aid in drainage, in front of stabilized earth layers 414. Higher level layers may only use geogrid reinforcements to retain stabilized earth. Higher level layers of the revetment can also include trees planted in protective tree tubes such as tree 402. As the trees 402, 403 (and others) planted in the revetment 400 grow, their roots provide structure to the revetment 400. In conventional planting, there the root ball is wrapped and placed directly in a hole, there is significant amount of failure of trees to take root and provide structure for the revetment. The tree tube of the inventive disclosure greatly facilitates initial root growth by providing protection against drying in the transportation and pre-planting time, as well as the initial time after planting. New root tendril can begin growing while the tree is in the tube, prior to planting. In the conventional method, any new roots that grow through the wrapping material will halt due to the lack of humidity.

Figure 5:
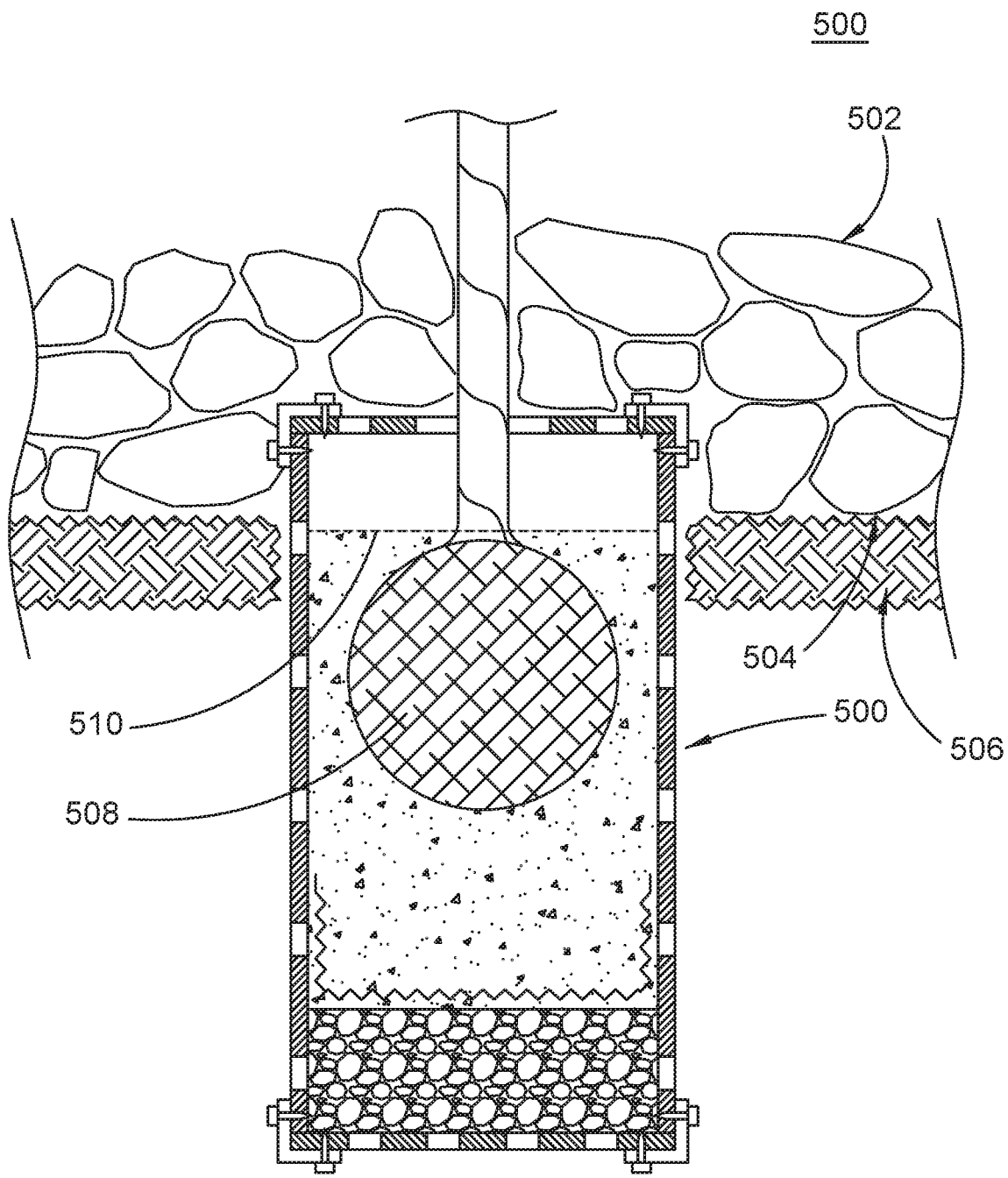
FIG. 5 shows a side cutaway view of a protective tree tube used in conjunction with rip rap in creating a revetment, in accordance with some embodiments.

FIG. 5 shows a side cutaway view of a protective tree tube 500 used in conjunction with rip rap 502 in creating a revetment, in accordance with some embodiments. The protective tree tube 500 used here can be substantially similar to that shown in previous figures, with the tree, root ball, drainage, filter fabric, and planting medium arranged in a substantially similar manner. The rip rap 502 in a revetment includes large objects like boulders that are arbitrarily arranged. The rip rap 502 breaks up the flow of water currents (e.g. rivers, waves, tides) to reduce the erosive effect on the underlying strata. The rip rap objects can be layered over the top of the protective tree tube 500 to reduce water currents against the protective tree tube 500, as well as to stabilize it in place. Under the rip rap 502 there can be a woven fabric layer 504 over a mechanically stabilized earth layer 506. The protective tree tube 500 can be placed in a hole in the earth at a depth such that the top of the root ball 508 is approximately the same height/depth as the top earth layer 506 under the rip rap, as indicated by dashed line 510. Tree species suitable for such applications can include, for example bald cypress, various mangrove species, and other species that can thrive in water, for warmer climatic regions. Other species can be used, depending on the climate at the location of the particular revetment. Over time roots from the root ball 508 will grow out of the protective tree tube 500, and the protective tree tube 500 will eventually break down and decompose, being primarily a wood pulp product.

Figure 6:
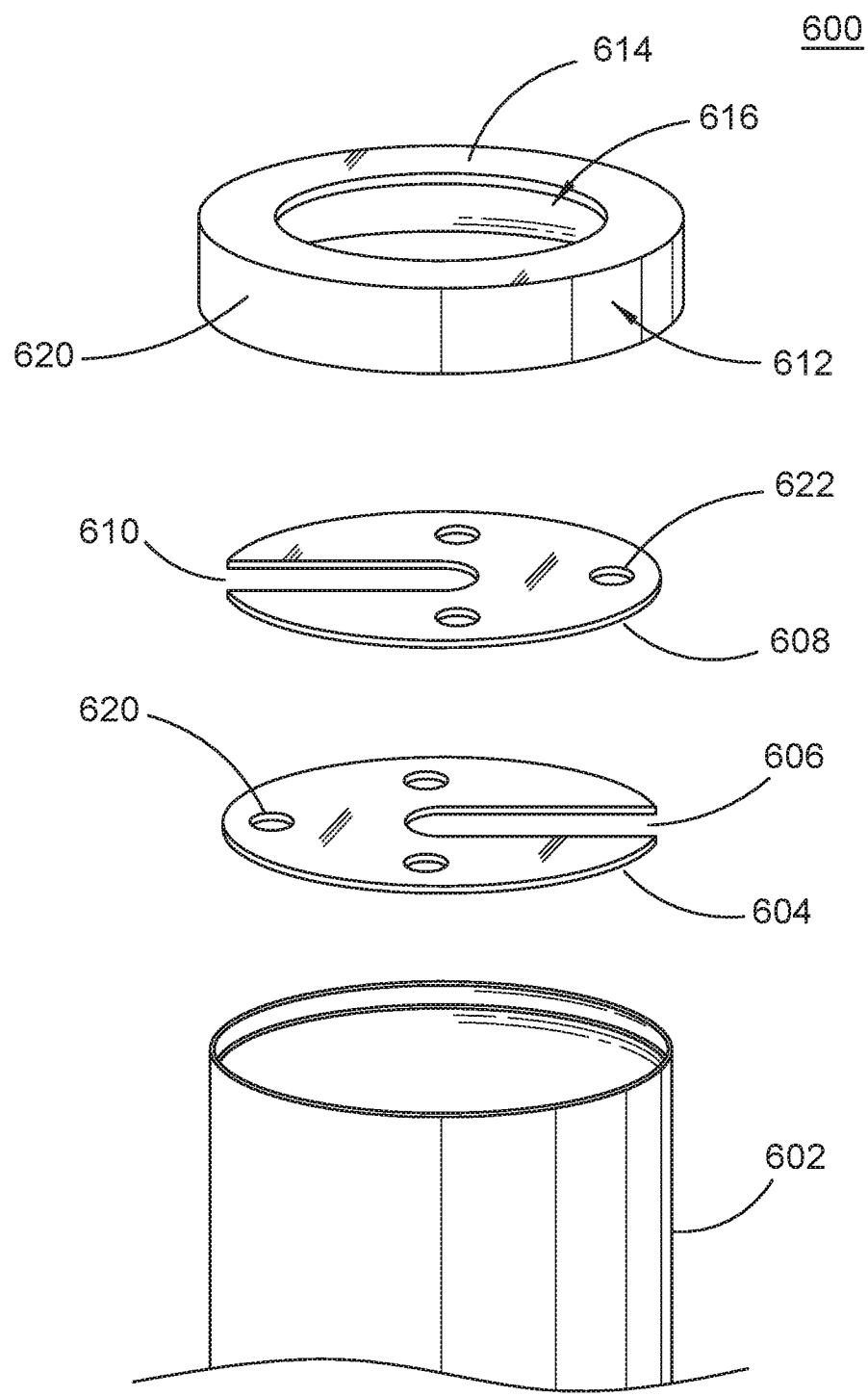
FIG. 6 shows a top cap assembly for a protective tree tube, in accordance with some embodiments.

FIG. 6 shows a top cap assembly 600 for a protective tree tube 602, in accordance with some embodiments. The top cap assembly 600 can form a top cap (e.g. 224 and/or 318). The protective tree tube 602 shown here is a double wall embodiment as shown in FIG. 3, but could equally be a single wall embodiment as shown in FIGS. 1-2. A first top cap member 604 is a substantially planar member that is sized and shaped to fit onto the top end of the protective tree tube 602, and has a slot 606 that extend from the side of the member 604 to a center of the member 604. The slot 606 is wide enough to allow the member 604 to pass over the trunk of a tree or shrub planted in the protective tree tube 602. When so placed, however, the slot 606, being open, does not provide support for the tree. A second member 608, which can substantially similar to the first member 604, is sized to fit over the first member 604, and likewise includes a slot 610. The two cap members 604, 608 can therefore be arranged so that their respective slots 606, 610 do not overlap except at the center of the cap members 604, 608 (e.g. forming a hole), thereby providing support completely around the trunk of the tree planted in the protective tree tube 602. A retainer 612 is size to fit over the top end of the protective tree tube 602 and the two top cap members 604, 608, and includes a side portion 620 that encircles the top end of the protective tree tube 602, and top portion 614 that extend over a portion of the top cap members 604, 608, and has an opening 616 to allow watering of the tree in the protective tree tube (e.g. through holes 622 624).

Figure 7:
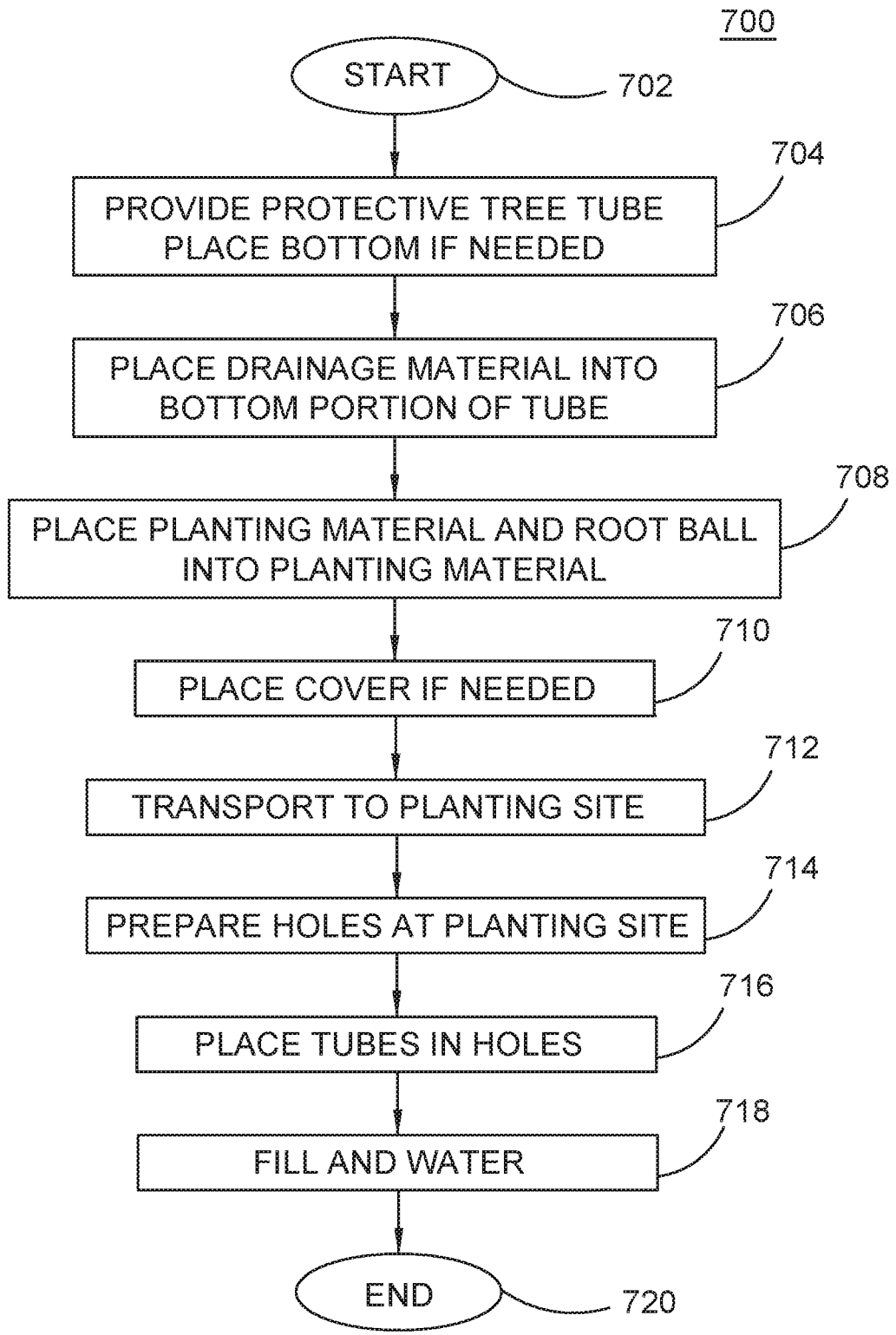
FIG. 7 shows a flow chart diagram of a method for preparing a tree for planting, and plating a tree in a protective tree tube, in accordance with some embodiments.

FIG. 7 shows a flow chart diagram of a method 700 for preparing a tree for planting, and plating a tree in a protective tree tube, in accordance with some embodiments. At the start 702 of the method 700 a tree has been grown, such as in a nursery, and is ready to be replanted at a plant site, such as a revetment. In step 704 a protective tree tube is provided that is designed in accordance with the disclosure herein. If the tree is to be placed into the protective tree tube, and then transported to the plant site, then a bottom cap can be placed on the bottom end of the protective tree tube. In step 706 drainage material is placed in the bottom of the protective tree tube, up to the indicated level on the outside of the protective tree tube (e.g. the lower stripe). In step 708 a fabric covering be placed over the drainage material at the bottom of the protective tree tube, and then some planting material can be placed on top of the drainage material and fabric layer. The root ball of the tree is then placed into the protective tree tube on top of the first portion of planting material, and then a second portion of planting material is added to surround and cover the root ball, up to the second or upper stripe on the outside of the protective tree tube. In step 710 a cover can be added with a retainer to hold the cover in place. In step 712, if the prior steps are done off site, then the protective tree tube with the tree in it can be transported to the planting site. In step 714 holes are prepared at the planting site to receive a protective tree tube. The holes are dug to a depth equal to the distance from the upper stripe to the bottom of the protective tree tube, leaving the upper portion extend upward above ground level once the protective tree tube is placed in the hole in step 716. In step 718 the holes is filled and water can be provided to the tree, and the method ends 720. Subsequently, regular watering is performed for a period of time to ensure establishment of the trees.

It has been found in testing that trees in protective tree tubes as disclosed herein side by side with conventionally planted trees of the same species grew more over a several month evaluation period. In a particular test for the rip rap portion of a revetment, grapefruit trees were planted using protective tree tubes and using conventional planting techniques. For the protective tree tubes, the tubes were put in place in the soil first, along with the conventionally planted trees. The tubes extended above the soil surface, and rip rap stones were placed around the buried tubes and conventionally planted trees. Then trees were planted in the tubes using a method substantially similar that of FIG. 7; drainage material was placed in the bottom of the tube up to the indicated depth, and then planting material placed on top of the drainage material, with the root ball of the tree being placed in the planting material substantially as shown in FIG. 2. After several months it was found that the trees in the protective tree tubes had grown to about 45 inches versus 33 inches for the conventionally planted trees, and about a 28 inch canopy for trees in the protective tree tube versus 22 inches for the conventionally planted tree. A similar difference in trunk diameter was also observed. Further, it was found that landscaping activity had resulted in damage to some of the conventionally planted trees, whereas no similar damage was found on those trees planted in protective tree tubes. It was also found that the protective tree tube material showed signs of decomposition, as intended.

A protective tree tube has been disclosed that protects and stabilizes a tree to allow the tree to root out from a root ball without the problems of the prior art. The protective tree tube is especially useful in establishing trees in locations like revetments that may be difficult to access once constructed. The disclosed protective tree tube can also protect the trees in transit from a nursery/farm to a final planting site.

What is claimed is:

1. A method of packaging a tree for transport and planting, comprising:
    providing a protective tree tube having an elongated hollow body with a top end and a bottom end and having a plurality of holes formed in the body, and a bottom cap covering the bottom end of the elongated hollow body, wherein the elongated hollow body and the bottom cap are made of biodegradable materials;
    placing a drainage material into a bottom portion of the elongated hollow body such that a top of the drainage material is above at least a lower-most set of holes in the elongated hollow body; placing a planting medium on top of the drainage material;
    placing a tree into the protective tree tube such that a root ball of the tree is surrounded by the planting medium and a trunk of the tree extends through the top end of the protective tree tube;
    transporting the tree in the protective tree tube to a revetment planting site; and
    planting the protective tree tube with the tree therein into a mechanically stabilized earth of the revetment planting site.

2. The method of claim 1, further comprising:
    placing a bottom retainer having a first portion that fits against an outer surface of the bottom cap, and a second portion depending from the first portion that extends partially along the elongated hollow body, and a plurality of fasteners coupling the bottom retainer to the bottom cap and the bottom end of the elongated hollow body, including a first plurality of fasteners that pass through the first portion of the bottom retainer and the bottom cap, and a second plurality of fasteners that pass through the second portion of the bottom retainer and the bottom end of the elongated hollow body.

3. The method of claim 2, further comprising:
    placing a top cap covering the top end of the elongated hollow body and comprised of a biodegradable material and having a plurality of ingress openings formed through the top cap;
    placing a top retainer having a first portion that fits against an outer surface of the top cap, and a second portion depending from the first portion that extends partially along the elongated hollow body at the top end; and
    placing a plurality of fasteners coupling the top retainer to the top cap and the top end of the elongated hollow body, including a first plurality that pass through the first portion of the top retainer and the top cap, and a second plurality of fasteners that pass through the second portion of the top retainer and the top end of the elongated hollow body.

4. The method of claim 3, wherein placing the top cap comprises placing two cap members, each of the cap members having a slot that extends from a side of the cap member to the center of the cap member and is sized to pass over the trunk of the tree planted in the protective tree tube, and wherein the method further comprises arranging the cap members so that their respective slots only overlap at the centers of the two cap members.

5. The method of claim 1, further comprising placing a fabric barrier between the drainage material and the planting medium.

6. The method of claim 1, further comprising:
    placing a top double wall portion at the top end of the elongated hollow body that extends downward from the top end and ends at a point above a midway point along the elongated hollow body;
    placing a bottom double wall portion at the bottom end of the elongated hollow body that extends upward from the bottom end and ends at a point below the midway point along the elongated hollow body;
    wherein the top and bottom double wall portions leave a middle portion of the elongated hollow body exposed; and
    placing a jute wrapping portion provided around the elongated hollow body at the middle portion of the elongated hollow body.

7. A method of planting a revetment, comprising:
    digging a hole in a portion of the revetment, wherein the hole extends into a mechanically stabilized earth portion of the revetment;
    placing a tree in a protective tree tube into the hole, including:
        providing an elongated hollow body with a top end and a bottom end, the elongated hollow body having a plurality of holes formed in the body, a bottom cap covering the bottom end of the elongated hollow body, and wherein the elongated hollow body and the bottom cap are made of biodegradable materials;
        placing a drainage material into a bottom portion of the elongated hollow body such that a top of the drainage material is above at least a lower-most set of holes in the elongate hollow body delineated by a marking on an outside of the elongated hollow body;
        placing a planting medium on top of the drainage material; and wherein the tree includes a root ball, wherein placing the planting medium includes placing the planting medium around the root ball such that the root ball is surrounded by the planting medium and separated from the drainage material by some of the planting medium;

placing the protecting tree tube into the hole such that the bottom end of the protective tree tube is in the mechanically stabilized earth portion of the revetment and wherein a top of the root ball is at approximately a same height as a top of the mechanically stabilized earth;

filling the hole around the protective tree tube.

8. The method of claim 7, wherein digging the hole comprises digging the hole behind a riprap portion of the revetment.

9. The method of claim 7, wherein digging the hole comprises digging the hole at a top level of the revetment.

10. The method of claim 7, wherein placing the tree in the protective tree tube further comprises providing the protective tree tube with:

a plurality of openings in a middle portion of the elongated hollow body that are each larger in size than each of the holes in the lower-most set of holes in the bottom end of the elongated hollow tube;

a top cap covering the top end of the elongated hollow body and comprised of a biodegradable material, and having a plurality of ingress openings formed through the top cap, the top cap including two members, each member being planar and sized and shaped to cover the top end of the elongated hollow body, and having a slot formed from an edge to a center of the respective member, and wherein the two planar members are arranged such that their respective slots overlap only around a trunk of the tree which passes through the slots;

a top retainer having a first portion that fits against an outer surface of the top cap, and a second portion depending from the first portion that extends at least partially around the sidewall of the elongated hollow body at the top end;

a bottom cap over the bottom end of the elongated hollow body;

a bottom retainer around the bottom end of the elongated hollow body that holds the bottom cap over the bottom end of the elongated hollow body;

a plurality of fasteners coupling the bottom retainer to the bottom cap and the bottom end of the elongated hollow body, including a first plurality of fasteners that pass through the first portion of the bottom retainer and the bottom cap, and a second plurality of fasteners that pass through the second portion of the bottom retainer and the bottom end of the elongated hollow body;

a top double wall portion at the top end of the elongated hollow body that extends downward from the top end and ends at a point above a midway point along the elongated hollow body;

a bottom double wall portion at the bottom end of the elongated hollow body that extends upward from the bottom end and ends at a point below the midway point along the elongated hollow body;

wherein the top and bottom double wall portions do not cover the middle portion of the elongated hollow body; and a jute wrapping portion provided around the elongated hollow body at the middle portion of the elongated hollow body that is not covered by the top and bottom double wall portions.

11. The method of claim 7, further comprising placing a layer of rip rap on top of the protective tree tube.

12. The method of claim 7 wherein the tree is one of a cypress tree or a mangrove tree.

13. A method of packaging a tree for transport and planting, comprising:

providing a protective tree tube having an elongated hollow body with a top end and a bottom end and having a plurality of holes formed in the body, and a bottom cap covering the bottom end of the elongated hollow body, wherein the elongated hollow body and the bottom cap are made of biodegradable materials;

placing a drainage material into a bottom portion of the elongated hollow body such that a top of the drainage material is above at least a lower-most set of holes in the elongated hollow body;

placing a planting medium on top of the drainage material;

placing a tree into the protective tree tube such that a root ball of the tree is surrounded by the planting medium and a trunk of the tree extends through the top end of the protective tree tube;

placing a top double wall portion at the top end of the elongated hollow body that extends downward from the top end and ends at a point above a midway point along the elongated hollow body;

placing a bottom double wall portion at the bottom end of the elongated hollow body that extends upward from the bottom end and ends at a point below the midway point along the elongated hollow body;

wherein the top and bottom double wall portions leave a middle portion of the elongated hollow body exposed; and placing a jute wrapping portion provided around the elongated hollow body at the middle portion of the elongated hollow body.

* * * * *